(12) United States Patent
Arioka

(10) Patent No.: US 6,914,875 B2
(45) Date of Patent: Jul. 5, 2005

(54) OPTICAL RECORDING MEDIUM AND OPTICAL RECORDING METHOD

(75) Inventor: Hiroyuki Arioka, Tokyo (JP)

(73) Assignee: TDK Corporation, Tokyo (JP)

(*) Notice: Subject to any disclaimer, the term of this patent is extended or adjusted under 35 U.S.C. 154(b) by 749 days.

(21) Appl. No.: 09/886,105

(22) Filed: Jun. 22, 2001

(65) Prior Publication Data
US 2002/0015371 A1 Feb. 7, 2002

(30) Foreign Application Priority Data

Jun. 22, 2000 (JP) ........................................ 2000-187568
Jun. 27, 2000 (JP) ........................................ 2000-192130
Jun. 29, 2000 (JP) ........................................ 2000-196959

(51) Int. Cl.[7] .............................. G11B 7/00; G11B 5/09
(52) U.S. Cl. .................................. 369/275.4; 369/59.11
(58) Field of Search ............................ 369/47.1, 47.51, 369/47.54, 53.1, 53.41, 59.11, 59.12, 59.26, 275.3, 275.4

(56) References Cited

U.S. PATENT DOCUMENTS 4,473,829 A * 9/1984 Schouhamer Immink et al. ............................................................ 347/264
6,690,640 B1 * 2/2004 Van Den Enden ....... 369/275.4
6,754,166 B2 * 6/2004 Arioka et al. ............ 369/275.1

FOREIGN PATENT DOCUMENTS

| JP | A 61-211835 | 9/1986 |
| JP | A 1-182846 | 7/1989 |
| JP | A 10-134353 | 5/1998 |

* cited by examiner

Primary Examiner—Thang V. Tran
Assistant Examiner—Bach Q. Vuong
(74) Attorney, Agent, or Firm—Oliff & Berridge, PLC

(57) ABSTRACT

Virtual recording cells are assumed within a groove on a recording layer of an optical recording medium. Recording marks with five or more different sizes are formed on each of the virtual recording cells by means of modulating the irradiation time of the laser beam in five levels or more in correspondence to the information to be recorded. The reflectance of the virtual recording cells modulates in many levels and the reflection level of the readout laser beam during regeneration is modulated in five levels or more.

27 Claims, 5 Drawing Sheets

OPTICAL RECORDING MEDIUM AND OPTICAL RECORDING METHOD

BACKGROUND OF THE INVENTION

1. Field of the Invention

The present invention relates to an optical recording medium and optical recording method that switches the irradiation time of a laser beam in many levels in correspondence to data used in the recording, irradiates the optical recording medium with the laser beam and then records the data in multiple levels.

2. Detailed Description of the Related Art

A great deal of research has been carried out relating to methods to record multiple pieces of data in signals with identical length by means of switching the depth of a regeneration signal (modulation factor of reflection signal) in many levels in contrast to methods to record data by means of changing the length of a regeneration signal (length of the modulated part of the reflection signal) in many levels.

According to this optical recording method, because it is possible to record multiple pieces of data in the direction of depth compared to when binary data is recorded depending on the presence or absence of only a pit, the amount of signals assigned to fixed lengths can be increased. Generally, methods to change the depth of a regeneration signal in many levels change the laser beam power in many levels to form different types of recording marks. At present, materials which use holographs or multi-layered recording materials are proposed for the optical recording medium.

Hereupon, a case wherein data is recorded in many levels using a depth variation of the reflectance etc is called multilevel recording.

In this type of multilevel recording the recording marks must be shortened in order to improve the recording density.

Multilevel recording is, however, difficult when attempting to reduce the recording marks smaller than the beam diameter of a converging laser used for recording and reading.

For example, Japanese Patent Laid-Open Publication No. Hei. 10-134353 describes a method in which the quantity of laser light is adjusted in order to record multiple levels. In this method a regeneration signal is formed by differences in the reflection of the recording part and the non-recording part when the recording medium is a dye film or a phase-changing film.

Consequently, in the method disclosed in Japanese Patent Laid-Open Publication No. Hei. 10-134353, the non-recording level and the recording level depend on a relationship of whether or not a recording exists and are not suitable for recording in many levels. Stated more clearly, nothing exists in the intermediate state between recording and non-recording for a phase-changing film or a dye film.

Up to the present the reason why multilevel recording in many levels was possible by means of modulating the quantity of laser light using a dye film or a phase-changing film as the recording medium was mainly due to the fact that the widths of the recording marks were changed by changing the power of the laser.

A converging beam normally forms a Gaussian distribution although when the recording film is a dye film or a phase-changing film, the recording is performed on the portion that exceeds a certain threshold value. Changing the power of the laser changed the spot size of the converging beam that can record which in turn changed the length of the recording marks.

If, however, the length of the recording marks are shortened more than the diameter of the converging beam to increase the recording density, it becomes difficult to perform multilevel recording in many levels, in particular in five levels or more, using a method that modulates the power of the laser to change the recording mark width. In other words, changing the recording power makes it difficult to change the reflection level during regeneration in five levels or more.

Following the conventional principle of gradually switching the laser power to achieve a multilevel recording results in the recording mark length growing larger than the diameter, of the converging beam (beam waist) for recording. Normally, the diameter of the converging beam is expressed by $K\lambda/NA$ (K: constant, $\lambda$: laser wavelength, NA: numerical aperture of lens). Normal values in a pickup used in a CD are $\lambda$=780 nm, NA=0.45 with the diameter of the converging beam being approximately 1.6 $\mu$m. For this case, if the recording mark length was set close to 1.6 $\mu$m, the above-mentioned problem of signal degradation was actualized which made it difficult to perform multilevel recording in five levels or more using a method that changes the laser power.

Further, there is an example of an optical recording medium as disclosed in Japanese Patent Laid-Open Publication No. Hei. 1-182846 wherein the absorbance of the reactive material in the recording layer changes as a digital value when a quantity of incident light on the recording layer is supplied as a digital value.

The absolute value of the absorbance change in response to the irradiation amount (frequency) of the laser is presumed to be very small for this optical recording medium however and has not yet attained practical use.

Furthermore, an optical recording method is disclosed in Japanese Patent Laid-Open Publication No. Sho. 61-211835 in which the intensity or irradiation frequency of the irradiation light irradiating a photochromic material is changed in order to record at different arbitrary coloring density states.

In this optical recording method there is a problem in which the coloring density state cannot be read in five levels or more when irradiating and scanning laser light.

The above-mentioned conventional multilevel recording had a problem of worsening signal quality during regeneration as the laser beam power increased during recording, namely, following increases in the depth of the reflection signal to be formed. The reason for this is not clear but a best guess by the inventor is thought to be caused by the area of the recording marks (recording mark area) growing larger due to increases in the laser power.

For example, when performing multilevel recording by shortening, the recording marks and switching the laser power in many levels within those marks in order to increase the density of the amount of recording information on the recording medium, degradation of the signal quality becomes very noticeable and ultimately lead to a state in which the merits of multilevel recording could not be taken advantage of. In other words, when attempting to use multilevel recording, even if the intervals between the recording marks widened and the signal quality degraded, the data had to be reliably detected to a certain degree.

In addition, the recording mark length following the conventional principle of gradually switching the laser power to achieve a multilevel recording is assumed to be larger than the diameter of the converging beam (beam waist) for recording.

The above-mentioned problems are considered to be a result of a complicated combination of all the laser beam power settings and characteristics of the recording medium. As far as the inventor knows, the origin of the problems has not become evident as of the present and high-density multilevel recording is currently not achievable using this recording medium and recording method.

SUMMARY OF THE INVENTION

The inventor discovered that it is possible to perform multilevel recording in five levels or more by means of changing the irradiation time of the laser when the recording mark length is shorter than the diameter of the converging beam. The inventor also discovered that a dye material that changes gradually is more suitable as a material for a recording film than a phase-changing material that changes quickly from non-recording to recording following temperature increases in the laser irradiation.

Taking the above-mentioned problems into consideration, an object of the present invention is to provide an optical recording medium and optical recording method that utilizes a widely used optical recording medium, such as CD-R, to perform multilevel recording in many levels and can obtain favorable signal quality.

Another object of the present invention is to propose a new multilevel recording method that can achieve high-density multilevel recording by means of setting the characteristics of the recording medium to a prescribed state.

The inventor diligently combined research on an optical recording medium and discovered recording method that performs multilevel recording on this optical recording medium. The inventor also verified that this recording method can perform high-density multilevel recording in five levels or more on this optical recording medium.

In other words, the above-mentioned objectives are achievable by means of the present invention as follows.

(1) An optical recording medium that can record information by irradiating laser beam to form recording marks on a recording layer and read the recorded information by irradiating a reading laser beam onto this recording mark. This optical recording medium is characterized by having virtual recording cells on the recording layer specified in an arbitrary unit length in a direction of relative movement between the laser beam and the recording layer and in a unit width in a direction that intersects the above-mentioned direction at a right angle and is continuously set in the direction of movement The recording layer on the virtual recording cells can form recording marks with different sizes for each of said virtual recording cell in correspondence to the modulation of the irradiation time of the laser beam in five levels or more. This allows multilevel recording of five levels or more of information by means of modulating the reflectance based on at least the area ratio out of the area ratio of the recording mark to the virtual recording cell and transmittance.

(1) An optical recording medium that can record information by irradiating laser beam to form recording marks on a recording layer and read the recorded information by irradiating a reading laser beam onto the recording mark; wherein said optical recording medium has virtual recording cells on said recording layer specified in an arbitrary unit length in a direction of relative movement between the laser beam and the recording layer and in a unit width in a direction that intersects the above-mentioned direction at a right angle and is continuously set in said direction of movement; said recording layer on said virtual recording cells can form the recording marks with different sizes for each of said virtual recording cell in correspondence to the modulation of the irradiation time of the laser beam in five levels or more to perform multilevel recording of five levels or more of information by means of modulating the reflectance based on at least the area ratio out of the area ratio of the recording mark to the virtual recording cell and transmittance.

(2) The optical recording medium according to (1), wherein the unit length of said virtual recording cell is set almost equal to the length of the recording mark formed by laser beam irradiation for the maximum amount of time.

(3) The optical recording medium according to (1) or (2), wherein: grooves for guiding laser beam are provided along said recording layer, said virtual recording cells are set inside said grooves and said unit width matches a width of said groove, (4) The optical recording medium according to any one of (1)–(3), wherein said unit length in said virtual recording cells are equal to or less than the diameter of beam waist of said reading laser beam.

(5) The optical recording medium according to any one of (1)–(4), wherein information is recorded in multiple levels in advance on one part of said recording layer.

(6) The optical recording medium according to any one of (1)–(5), wherein specific information which represents a multilevel recording medium is recorded on at least one of said virtual recording cells and a multilevel recorded part.

(7) The optical recording medium according to any one of (1)–(6), wherein grooves for guiding laser beam are provided along said recording layer and are cut in the middle.

(8) The optical recording medium according to any one of (1)–(7), wherein said recording layer is made of an organic dye.

(9) The optical recording medium according to (1), wherein when a reflectance fluctuation width stipulated from an initial reflectance X % of said virtual recording cells before irradiation of said laser beam and from the minimum limit reflectance Y % after irradiation of said laser beam is X/100–Y/100, said virtual recording cells are set to have a characteristic of:

$$1.8 < (B-A)/A < 11 \qquad \text{formula (1)}$$

where A is the irradiation time necessary to reduce the initial reflectance X % by 20%, assuming this entire fluctuation width to be 100%, through the use of said laser beam irradiation at a fixed power and B is the irradiation time necessary to reduce the initial reflectance X % by 80% of said reflectance fluctuation width X/100–Y/100, through the use of said laser beam irradiation, such that said optical recording medium can perform multilevel recording on said virtual recording cells by switching the irradiation time of said laser beam at a fixed power in five levels or more.

(10) The optical recording medium according to (9), wherein the recording marks with a plurality of sizes, formed by switching the irradiation time of said laser beam in five levels or more and recording at multiple levels include a recording mark with a length equal to or less than the diameter of converging beam waist of the reading laser beam as a part.

(11) The optical recording medium according to (9) or (10), wherein said recording layer of said optical recording medium includes an organic dye component.

(12) The optical recording medium according to any one of (9)–(11), wherein said initial reflectance X of said virtual recording cells before recording is 40% or more and said minimum limit reflectance Y after recording is (X−10) % or less.

(13) The optical recording medium according to (12), wherein said minimum limit reflectance Y after recording is 30% or less.

(14) The optical recording medium according to (1), wherein the recording medium is composed such that said laser beam irradiates to form a plurality of recording marks with different sizes in a state in which a ratio between a longest irradiation time TL and a shortest irradiation time TS during the irradiation of said recording layer at said irradiation time of five levels or more satisfies the relationship of $$0.05 < TS/TL 21\ 0.5 \quad \text{formula (2)}$$

(15) The optical recording medium according to (14), wherein said recording layer includes an organic dye.

(16) The optical recording medium according to (14), wherein said longest irradiation time TL of said laser beam is set to $2 \times 10^{-8} < TL < 1 \times 10^{-6}$ (sec).

(17) The optical recording medium according to (16), wherein said recording layer includes an organic dye.

(18) An optical recording method comprising the step of irradiating a laser beam onto a recording layer while moving either the recording layer or laser beam in a constant direction to form recording marks onto the recording layer, thereby recording information; said optical recording method further comprising the steps of:

assuming virtual recording cells continuously in said movement direction on said recording layer;

modulating an irradiation time of the laser beam in five levels of more for each of said virtual recording cell; and forming the recording marks with different sizes in said virtual recording cells to perform multilevel recording of five levels or more of information by means of modulating the reflectance of the entire virtual recording cells based on at least the area ratio out of the area ratio of the recording mark to the virtual recording cell and transmittance.

(19) The optical recording method according to (18), wherein said recording layer comprises a material that modulates at least the size out of the size and transmittance of the recording mark, only in response to the irradiation time when the beam diameter of the laser beam is fixed, and the laser beam irradiates with a fixed beam diameter.

(20) The optical recording method according to (18), wherein said laser beam irradiates to form a plurality of the recording marks with different sizes in a state in which a ratio between a longest irradiation time TL and a shortest irradiation time TS during said irradiation time of five levels or more satisfies the relationship of 0.05<TS/TL<0.5 . . . formula (2)

(21) The optical recording method according to (20), wherein the recording marks with different sizes formed by irradiation of said laser beam include a recording mark with a length equal to or less than the diameter of the converging beam of the reading laser as a part.

(22) The optical recording method according to (20) or (21), wherein said longest irradiation time TL of said laser beam is set to $2 \times 10^{-8} < TL < 1 \times 10^{-6}$ (sec).

(23) The optical recording medium according to (18), wherein when a reflectance fluctuation width stipulated from an initial reflectance X % of said virtual recording cell before irradiation of said laser beam and from the minimum limit reflectance Y % after irradiation of said laser beam is X/100−Y/100, said virtual recording cells are set to have a characteristic of: 1.8<(B−A)/A<11 . . . formula (1)

where A is the irradiation time necessary to reduce the initial reflectance X % by 20%, assuming this entire fluctuation width to be 100%, through the use of said laser beam irradiation at a fixed power and B is the irradiation time necessary to reduce the initial reflectance X % by 80% of said reflectance fluctuation width X/100−Y/100, through the use of said laser beam irradiation, and multilevel recording is performed on said virtual recording cell by switching the irradiation time of said laser beam at a fixed power in five levels or more.

(24) The optical recording medium according to (23), wherein multilevel recording is performed by switching the irradiation time of said laser beam in five levels or more so as that the recording marks with a plurality of sizes formed by a laser beam irradiation include a recording mark with a length equal to or less than the diameter of converging beam waist of the reading laser beam as a part.

(25) The optical recording medium according to (22) or (24), wherein said recording layer includes an organic dye component so that the recording layer has the characteristics mentioned above.

(26) The optical recording medium according to any one of (22)–(24), wherein the characteristics of said recording layer are set in order that said initial reflectance X of said virtual recording cell before recording is 40% or more and said minimum limit reflectance Y after recording is (X−10)% or less.

(27) The optical recording medium according to (26), wherein said minimum limit reflectance Y after recording is 30% or less.

When the recording mark is smaller than the diameter of the recording beam in this invention, the reflectance could be controlled in many levels not by the power of the recording laser but by adjusting the irradiation time of the laser in many levels. In other words, multilevel recording could be performed by modulating the size of the recording marks and changing the level of the reflectance using the area ratio of the recording marks within a fixed area by means of modulating the irradiation time of the laser with the fixed recording power. Further, modulating the size of the recording marks stated here refers to changes in the quantity when the material constituting the recording layer decomposes and is altered due to irradiation of the laser beam to change the refractive index, or when the transmittance is changed due to the size in the direction of thickness.

These effects were obvious when performing multilevel recording in five levels or more.

Namely, multilevel recording was possible using an ordinary method that modulated the laser power if the modulation was done up to four levels or so. However, controlling the laser irradiation time is essential when performing high-density multilevel recording at five levels or more.

This recording method was especially useful for an optical recording medium having a recording film that used an organic dye.

The goals of the inventor were the fluctuation characteristics in the reflectance of the optical recording medium and the multilevel recording method. In particular, concerning the optical recording medium, the inventor noticed the relationship between the irradiation time of the laser beam and changes in the reflectance due to the irradiation time and proved that signal degradation was greatly reduced while performing multilevel recording if the recording was within the range of relational formula (1) mentioned above.

According to the inventor's analyses, as indicated by the typical values in FIG. 5, fluctuations in the reflectance do not necessarily have a fully proportional relationship to the irradiation time of the laser beam. All reflectance fluctuations initially start with initial reflectance X %. Then, the reflectance fluctuations grow smaller in initial time region H up to the point where approximately 20% of reflectance fluctuation width P is reached. Fluctuations grow relatively larger in intermediate time region I while approximately 80% of reflectance fluctuation width P is reached, the reflectance fluctuation grows smaller in final time region J and then finally the reflectance fluctuation converges at minimum limit reflectance Y %.

From these characteristics a prediction was formed by the inventor that the relationship between time A required to emerge from initial time region H and time B required after emerging from initial time region H until emerging from intermediate time region I would become an essential point for multilevel recording. This prediction makes it necessary to set the reflectance and perform recording in many levels between initial reflectance X % and minimum limit reflectance Y % for multilevel recording. Also it is necessary to efficiently use the above-mentioned intermediate time region I. In other words, the balance between time A and time B has a great significance on the recording laser.

In reality, according to the inventor's analyses, multilevel recording in five levels or more could be performed if the recording was within the range of formula (1) mentioned above although they verified that if it was too large outside this range (10 or more) or if it was to small (1.8 or less), interference would occur with the multilevel recording.

For example, if (B−A)/A is 1.8 or less in this relational formula (1), it is considered that a suitable recording power cannot be set because the reflectance fluctuations due to the recording power are sudden. If the value is 11 or more, it is considered that the reflectance fluctuations relative to the recording power will be too small making it impossible to set a suitable recording power.

The inventor also found an optical recording medium was of a poor balance between initial time A and intermediate time B and was not suitable for multilevel recording.

In order to satisfy this condition, the recording layer material, film thickness of the recording layer, reflecting layer material, substrate material and thickness, and the shape of the groove etched on the substrate for use as a laser guide are suitably set. It is also possible to use methods other than these to suitably adjust the laser power for recording. This set laser power becomes the recommended recording power for the optical recording medium. For example, information is recorded in advance on a medium such as ATIP. For example, it is understood that if the recommended recording power is set high, (B−A)/A will grow larger and if it is set small, (B−A)/A will grow smaller.

The relationship $2 \leq (B-A)/A \leq 9$ is also preferable within the range of formula (1) mentioned above.

If an optical recording medium set within the above-mentioned range is used, recording marks equal to or less than the diameter of the converging beam waist of the reading laser (conventionally considered to be unusable) can be included which reduces signal degradation when this recording medium is used. In addition, the generation of recording marks equal to or less than the diameter of the converging beam waist is difficult when actually irradiating a laser beam by controlling the power. The inventor verified that recording marks equal to or less than the diameter of the converging beam waist could be generated by switching the irradiation [time] (onto a unit virtual recording cell) in five levels or more to control the laser beam at a fixed power that uses only a threshold value representing the intensity, of a fixed laser light that normally represents a Gaussian distribution without modulating the power. From an understanding of each of the above elements, if the recording medium of the present invention is used, an optical recording medium that can record at a very high density is obtained. This recording medium includes five levels or more as well as recording marks equal to or less than the diameter of the converging beam waist.

In the above-mentioned invention it is preferable for the recording layer of the optical recording medium to include an organic dye component. In reality, the above-mentioned multilevel recording has been achieved using a method that generates recording marks by a reaction of an organic dye component by the inventor.

Even further, in the invention above it is preferable for the initial reflectance X of the virtual recording cells before recording to be 60% or more and the minimum limit reflectance Y after recording to be 40% or less. If the values are set in this manner, the reflectance fluctuation width can be sufficiently ensured making it possible to generate recording marks in many levels.

As described above, the inventor discovered that multilevel recording is possible through a new concept of modulating the laser irradiation time without modulating the laser power for recording. As a result, it becomes possible to rapidly enhance the recording density.

It was proved, however, that there was a chance that it may not be possible to reliably scan recording marks when only forming the recording marks by means of modulating just the irradiation time. Thereupon, the results of further analyses of the inventor discovered that if the ratio between the shortest irradiation time and the longest irradiation time was obtained within the range of relational formula (2) mentioned above, the scanning accuracy could be greatly enhanced. Furthermore, the shortest irradiation time is the time required to obtain the maximum reflectance in a reflectance set to five levels or more and the longest irradiation time is the time required to obtain the minimum reflectance.

For example, if the laser beam irradiation time for recording is made extremely long in order to form a recording mark that greatly reduces the reflectance of a virtual recording cell, the recording mark area will grow too wide and the signal quality will deteriorate compared to forming a recording mark with a high reflectance. In contrast, if the laser beam irradiation time is made extremely short in order to form virtual recording cells with a high reflectance, recording with sufficient depth will become impossible.

A certain irradiation time region (minimum irradiation time~maximum irradiation time) is needed to perform multilevel recording in five levels or more. Taking this fact into consideration, a type of restriction is achieved in the irradiation time range by setting the ratio between the shortest irradiation time and the longest irradiation time of the laser beam within the range of relational formula (2) mentioned above which in turn restrain from becoming an excessively long irradiation time or an excessively short irradiation time. In other words, it is assumed to add conditions which require examinations when performing longest and shortest recording to enhance the recording accuracy.

They were able to easily conclude that if the value is 0.05 or higher in this relational formula (2), the longest irradiation time would be too long or the shortest irradiation time would be too short. For the former, regeneration of information cannot be performed correctly due to worsening signal quality of the virtual recording cells (of recording marks) with low reflectance and for the latter, regeneration of information cannot be performed correctly due to insufficient recording of the virtual recording cells (of recording marks) with high reflectance.

Furthermore, they were able to easily conclude that if the value is 0.5 or less in this relational formula (2), the longest irradiation time would be too short or the shortest irradiation time would be too long. For the former, regeneration of information cannot be performed correctly due to insufficient recording of the virtual recording cells (of recording marks) with low reflectance and for the latter, regeneration of information cannot be performed correctly due to worsening signal quality of the virtual recording cells (of recording marks) with low reflectance.

Namely, if this relational formula (2) is used, it becomes possible to very realistically set (modify) the irradiation time.

Signal characteristics during multilevel recording can be made favorable using the optical recording method of the invention described above. In addition, because the laser beam irradiation time is changed, it becomes possible to make the recording marks smaller by only the amount that the irradiation time changes. In more concrete terms, it is preferable to include recording marks having lengths equal to or less than the diameter of the converging beam of the reading laser in one portion of the recording marks formed by switching the laser beam irradiation time in five levels or more. Carried out in this manner makes it possible to rapidly enhance the recording density compared to a conventional case.

It is also preferable for 0.04<TS/TL<0.6 to be set within the range of relational formula (2) mentioned above and even more preferable for 0.05<TS/TL<0.5 to be set. For example, even if the laser beam power is fixed, the ratio of the values in relational formula (2) will be different because of different characteristics of the recording mediums. Moreover, even it the recording mediums are the same, there is a possibility that the ratio of the values in relational formula (2) will be different because of different laser beam powers. Consequently, it is preferable for the relational formula to be satisfied taking into consideration optimum characteristics of the recording mediums and optimum laser beam powers.

For example, if the goal is the characteristics of the recording mediums when forming recording marks on each virtual recording cell to reach a reflectance of five levels or more, a virtual recording cell will exist with the maximum reflectance and a virtual recording cell will exist with the minimum reflectance. The laser irradiation time will be at its shortest for virtual recording cells with the maximum reflectance and at its longest for virtual recording cells with the minimum reflectance. Hereupon, if a medium with large changes (reductions) in the reflectance relative to the irradiation time, namely a medium that can easily record in short times, is used, the shortest irradiation time and the longest irradiation time will be in close proximity. Because of this, the value of relational formula (2) becomes larger. This ultimately makes control of the reflectance using the irradiation time difficult for a recording medium with a value of 0.5 or more in relational formula (2) and causes the recording marks to become too large. Therefore, this is not suitable for recording mediums with many values.

In contrast, if a medium with small changes (reductions) in the reflectance relative to the irradiation time is used, the value in relational formula (2) will become smaller. This increase the possibility that very small recording marks not easily detectable may be include for recording mediums with values of 0.05 or less and of course are not suitable for recording mediums with many values.

As a result, the significance of "optical recording medium selection" is included in the optical recording method of this invention. This is due to the necessity of compatibility between the recording medium and the recording method in order to satisfy relational formula (2). This invention is realized at the point where compatibility is reached and then the detection accuracy of data is actually enhanced.

In the above-mentioned invention, although fixed conditions are achieved using relational formula (2) in order to enhance the accuracy of multilevel recording, it is preferable if the longest irradiation time TL of the laser beam if further set to $2\times10^{-8}<TL<1\times10^{-6}$ sec (20 nsec<TL<1 $\mu$sec) to make the accuracy even more reliable.

The optical recording medium that can be recorded on by means of the optical recording method according to the above-mentioned invention is suitable for multilevel recording because if its characteristics which make it possible to achieve the objects mentioned above. Preferably the recording layer used for this recording is composed of an organic dye. The inventor also verified that multilevel recording in five levels or more is actually achieved.

BRIEF DESCRIPTION OF THE DRAWINGS

These and other objects and advantages of the present invention will become clear from the following description with reference to the accompanying drawings, wherein.

PREFERRED EMBODIMENTS OF THE INVENTION

Figure 1:
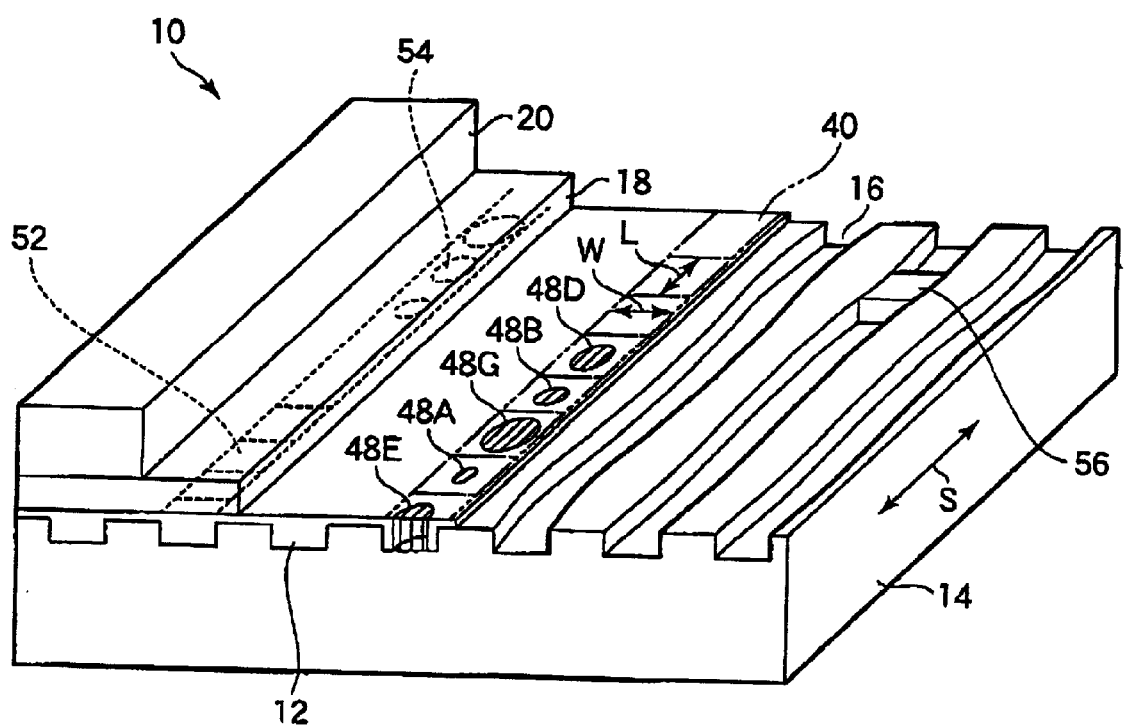
FIG. 1 is a partial cross-sectional perspective view showing principle parts of an optical recording medium according to an embodiment of the present invention.

Embodiments of the present invention will be now described in detail with reference to the drawings.

The optical recording medium (disk) 10 according to the embodiment of the present invention is a CD-R that uses a dye on the recording layer 12 and includes a substrate 14 made of a transparent material, the recording layer 12 containing a dye coated on and covering the grooves 16 used to guide the laser beam formed on one surface of the substrate 14 (upper surface in FIG. 1), a gold or silver reflecting film 18 formed by sputtering on the upper side of the recording layer 12, and a protective layer 20 that covers the outside of the reflecting film 18.

The dye used on the recording layer 12 is an organic dye such as cyanine dye, merocyanine dye, or methine dye and a derivative or these, a benzene thiol metal complex, phthalocyanine dye, naphthoquinone dye and azo dye.

Figure 2:
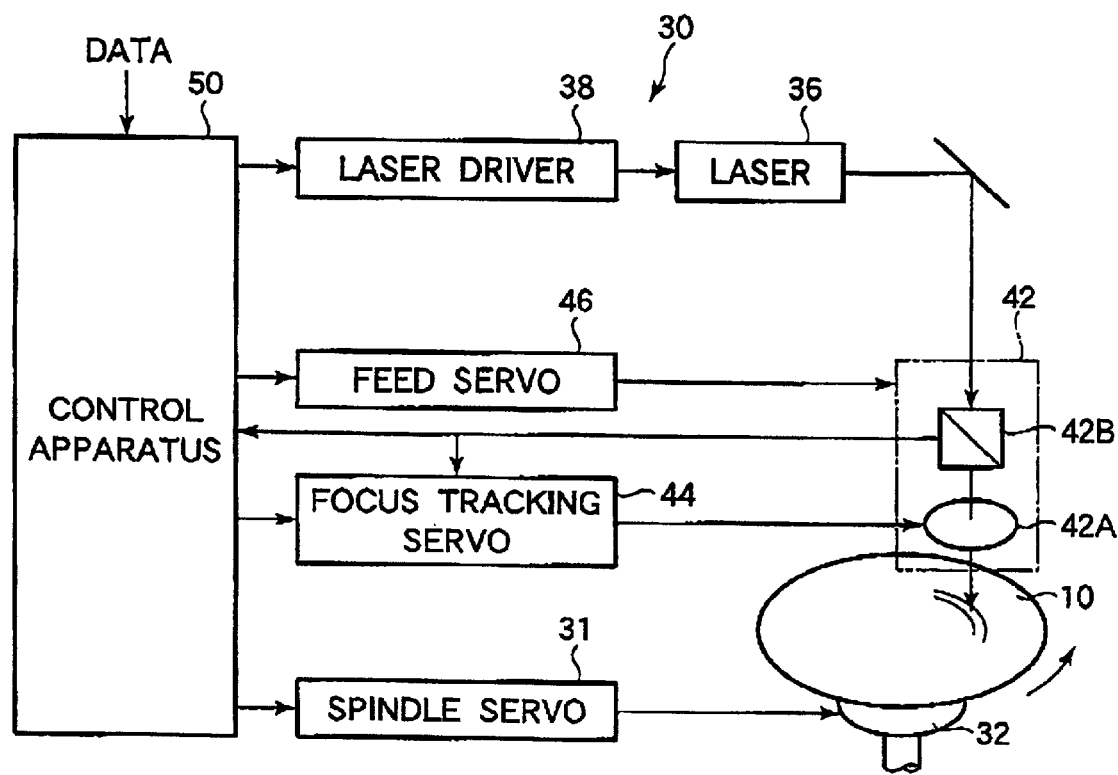
FIG. 2 is a block diagram showing an optical recording device that uses a laser beam to record information on the optical recording medium.

Multilevel recording onto the optical recording medium 10 is performed by means of an optical recording apparatus 30 shown in FIG. 2.

The optical recording apparatus 30 is a CD-R recorder. This recorder records information onto the recording layer 12 formed as described above on the optical recording medium (disk) 10 by irradiating a laser beam from a laser 36 while rotating the optical recording medium (disk) 10 at a fixed linear velocity via a spindle servo 31 by a spindle motor 32.

Figure 3:
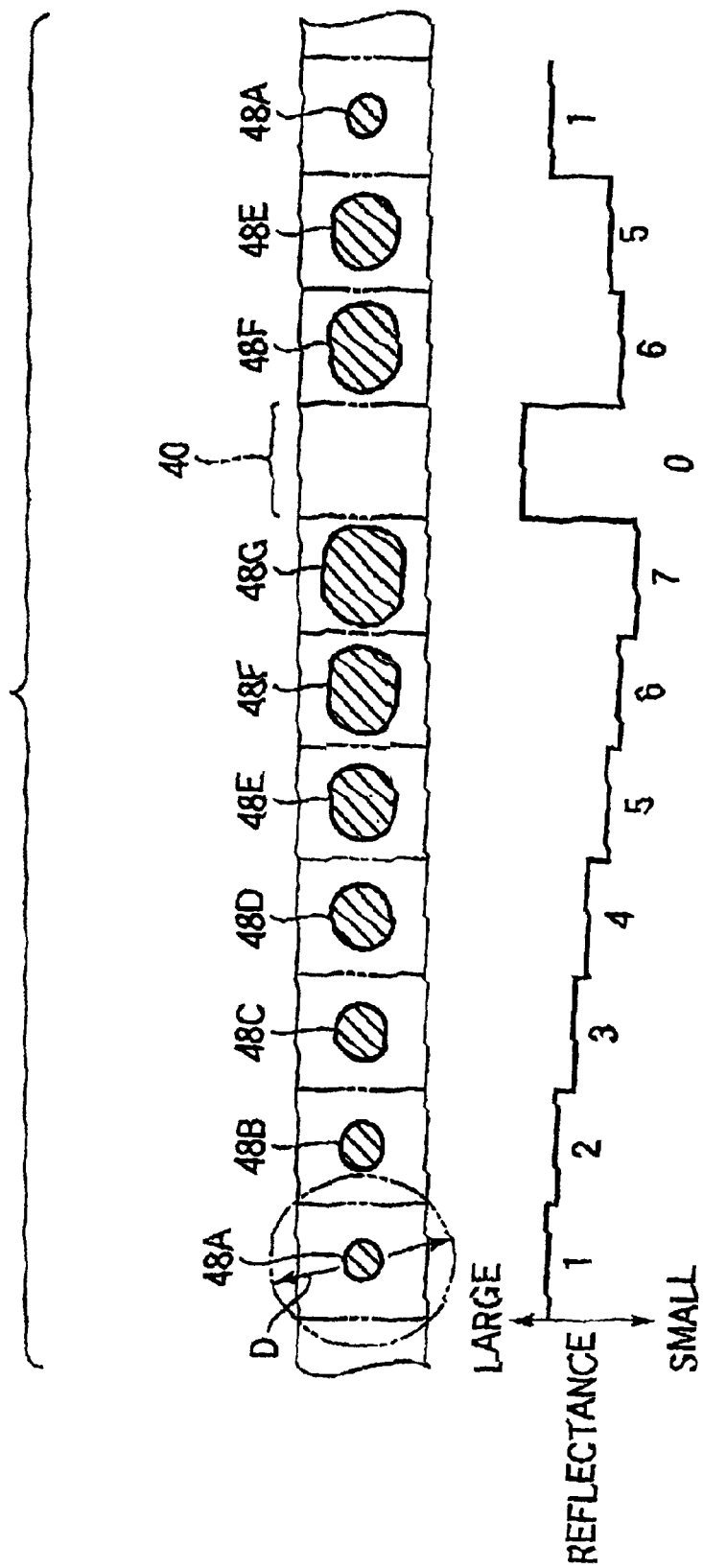
FIG. 3 is a schematic view showing the relationship between a recording mark, a virtual recording cell and the optical reflectance when forming the recording mark on a recording layer by the optical recording device.

The laser 36 is designed to use the laser driver 38 to control the laser beam irradiation time, namely, the number of laser pulses, for each of the virtual recording cells 40 (described later), shown in FIG. 1 and FIG. 3, corresponding to information to be recorded.

Reference numeral 42 in FIG. 2 denotes a recording optical system that includes an objective lens 42A and a half mirror 42B. Focus tracking control for the objective lens 42A is performed by a focus tracking servo 44 in order that the objective lens 42A converges the laser beam on the recording layer 12 of the disk 10. Further, The objective lens 42A and the half mirror 42B are controlled and moved by a feed servo 46 at a fixed velocity from the outer periphery to the inner periphery synchronous with the rotation of the disk 10.

The spindle servo 31, laser driver 38, focus tracking servo 44 and feed servo 46 are controlled by a control apparatus 50. Data (information) to be recorded onto the recording layer 12 is entered into the control apparatus 50.

Next, the virtual recording cell 40 and the recording marks recorded on the virtual recording cell 40 will be described.

This virtual recording cell is specified in a unit width in the radial direction and a unit length in the rotational direction of a recording medium. A unit width is a width equal to or less than the diameter of the beam waist of laser beam and can be freely selected from among the track pitch of groove width of the disk 10.

At first, as shown in FIG. 1, the virtual recording cells 40 are continuously specified in the rotational direction, or the circumferential direction S, of the disk 10 in the groove 16. The unit length of each virtual recording cell 40 in the circumferential direction S is denoted as L and as shown in FIG. 3, is set to a length shorter than the beam diameter D (diameter of beam waist) Additionally, the unit width in the direction perpendicular to the unit length L is denoted as W. The laser beam is irradiated onto each virtual recording cell 40 forming the recording marks 48A~48G in response to the information to be recorded as shown in typical fashion.

Here, the beam diameter D of the laser beam emitted from the laser 36 at the position of the recording layer 12 is made larger than the virtual recording cell 40. Depending on the material selected for the recording layer 12, however, the recording marks 48A~48G can be formed with different diameters at the center of the laser beam in response to the laser irradiation time (The laser beam is circular although since the beam irradiates while the optical recording medium is rotating, the recording marks form long circular shapes s in response to the irradiation time.).

Because the focused laser beam normally forms a Gaussian distribution, recording is only performed at the portion where the threshold value of the irradiation energy of the laser beam is exceeded on the recording layer 12. Because of this, it is considered that the spot size of the laser beam that can record on the recording medium changed due to changes in the irradiation time of the laser beam. This, for example, can form seven levels of recording marks 48A~48G as shown in FIG. 3.

For this case, the size of each of the recording marks 48A~48G is set such that the reflectance of the reflecting light when the reading laser beam irradiates the virtual recording cells 40 changes in seven levels. The reflectance is made larger as the recording marks become smaller. The maximum reflectance is present at virtual recording cells where recording marks are not formed the minimum reflectance is present at virtual recording cells where the largest recording mark 48G is formed.

In more detail, the reflectance is set taking into consideration the area ratio for the virtual recording cells 40 of each of the recording marks 48A~48G and the transmittance of the recording marks themselves.

The transmittance of the recording marks 48A~48G themselves differs because the material constituting the recording layer 12 decomposes and is altered due to irradiation of the laser beam to change the reflective index, or the transmittance is changed due to the changes in the thickness direction of the recording layer 12. If the transmittance of the recording mark portion that has been formed is zero, there is no need for this consideration.

Next, the characteristics of the disk 10 will be described.

For this disk 10 the initial reflectance when the laser beam is not irradiating the virtual recording cells 40 is X % or the reflectance that reaches the limit (minimum reflectance) due to the laser beam irradiating (long time to a certain degree) is Y %. The reflectance fluctuation width (X−Y) is stipulated from these values.

For this case, the irradiation time necessary to reduce the reflectance of the virtual recording cells 40 from the initial reflectance X % by 20% of the reflectance fluctuation width using laser beam irradiation at a fixed power is A and the irradiation time necessary to further continue the irradiation and reduce the reflectance by 80% of the reflectance fluctuation width is B.

Here, the characteristics of the disk 10 are set such that the reflectance fluctuation balance T=(B−A)/A specified from each of the above-mentioned values is 1.8<(B−A)/A<11 (relational formula (1)). This is achieved by suitably adjusting the thickness and material of the substrate 14, recording layer 12, and reflecting layer 20.

When set in this manner, multilevel recording becomes possible by switching the irradiation time of the laser beam at a fixed power (recommended recording power) irradiating the virtual recording cells 40 to five levels or more (seven levels in the example above) as previously described. In particular, data can be reliably detected even if the length of the recording marks 48A~48G of multilevel recording are equal to or less than the diameter D of the converging beam waist of the reading laser.

As a result, an optical recording medium with a very high possible recording density can be obtained because very small recording marks equal to or less than the diameter of the converging beam waist can be generated so the reflectance is different in five levels or more.

It is also preferable in the invention above for the recording layer of the optical recording medium to include an organic dye component. In reality, the above-mentioned multilevel recording is achieved using a method that generates recording marks by a reaction of an organic dye component as described in a subsequent embodiment.

For this disk 10 the initial reflectance X of the virtual recording cells 40 is set to 40% or more and the minimum limit reflectance Y is set to (X−10)% or less. This is because the reflectance will not be suitable for multilevel recording of five levels or more if there is a reflectance fluctuation width up to a certain point. Under the condition that the reflectance fluctuation width up to 10%, multilevel recording in five levels or more is actually achieved.

Although in this embodiment the disk is a CD-R as the optical recording medium in the present embodiment, the present invention is not limited to this. Another optical recording medium can normally be applied and is not limited to a rotating disk shape either.

Furthermore, although the recording layer 12 in this embodiment uses an organic dye such as cyanine, the present invention is not limited to this and a recording layer whose characteristics satisfy relational formula (1) mentioned above is sufficient. An organic dye other than the dyes described above, an inorganic dye or another suitable material can also be used. However, when an organic dye as described is used, recording can be reliably performed by changing the size of the recording marks in correspondence to an irradiation time of a laser beam in five levels or more making it possible to read data with very high precision.

Next, further adjustments to the laser beam irradiation time in order to achieve high-density multilevel recording will be described. In these adjustments the settings are such that the ratio between longest irradiation time TL (this is a value for recording mark 48G) and shortest irradiation time TS (this is a value for recording mark 48A) satisfies the relationship of $0.05<TS/TL<0.5$ (relational formula (2)). As a result, the signal characteristics during reads can be improved. Consequently, as shown in FIG. 3, the recording marks can be reduced by that amount only and the data can be sufficiently read even if recording marks (all recording marks 48A~48G) are formed with lengths equal to or less than the diameter D of the converging beam of the reading laser.

The example in this embodiment disclosed a case when all the recording marks are equal to or less than the diameter D of the converging beam although the present invention is not limited to this and can include one portion of the recording marks being equal to or less than the diameter D or all the recording marks are equal to or more than the diameter D of the converging beam.

The above-mentioned longest irradiation time TL of the laser beam is set within a range of $2\times10^{-8}<TL<1\times10^{-6}$ (sec).

Here new concept of modulating the laser irradiation time without modulating the laser power for recording has been used although when forming recording marks by modulating just the irradiation time, there is a possibility that it may not be possible to reliably read those recording marks. However, since the ratio between the shortest irradiation time TS and the longest irradiation time TL is obtained within the range of relational formula (2) using this optical recording method, the read accuracy can be greatly improved.

The irradiation time region up to a certain level (shortest irradiation time TS~longest irradiation time TL) must be set in order to perform multilevel recording in five levels or more. Because a kind of restriction is provided at this time to set the ratio between the shortest irradiation time and the longest irradiation time to within a fixed range, it becomes possible to restrain from becoming excessively long irradiation times or excessively short irradiation times. In other words, the irradiation time is very realistically set (modified) using relational formula (2).

The optical recording method according to the example in the embodiment described above can improve the signal characteristics during multilevel recording and reduce the recording marks by that amount. As previously described, recording marks 48A~48G with lengths equal to or less than the diameter D of the converging beam of the reading laser can also be included. As a result, it is possible to rapidly enhance the recording density per unit area ratio compared to a conventional case.

This optical recording method also includes the viewpoint of selecting the disk 10. This is due to the fact that compatibility between the optical recording medium 10 and the recording method is necessary in order to satisfy the relational formula (2). Therefore, the disk 10 realized by relational formula (2) is suitable for multilevel recording.

The example in the embodiment described above is an example for the optical recording medium 10 that does not record information such as data although the present invention is not limited to this. The present invention may be applied to an optical recording medium that records multilevels of information in five levels or more.

Even further, the size of the virtual recording cells 40 set in the recording layer 12 when forming recording marks by means of the optical recording apparatus 30 is not limited to the example in this embodiment but can be any length equal to or less than the diameter of the beam waist of the laser beam. In addition, although the size of the virtual recording cells 40 can be freely set for an optical recording medium not provided with the grooves 16, it is preferable to set the virtual recording cells 40 to a length almost equal to the recording marks formed when the irradiation energy at the point where laser bean is at its longest irradiation time exceeds the threshold value that provides changes to the recording.

In particular, if the diameter of the beam waist of the laser beam even smaller can be reduced, the size of the virtual recording cells 40, or the length can be made equal to the width of the grooves 16. In contrast to this, the size of the virtual recording cells 40 can be set equal to or more than the laser beam waist when recording recording marks in many levels (for example, eight levels). For this case, one portion of a recording mark can be set to a size equal to or more than the laser beam waist. Of course, the present invention can be applied to disks with various different constructions already being practically used without regard to the construction of the embodiment.

Figure 4:
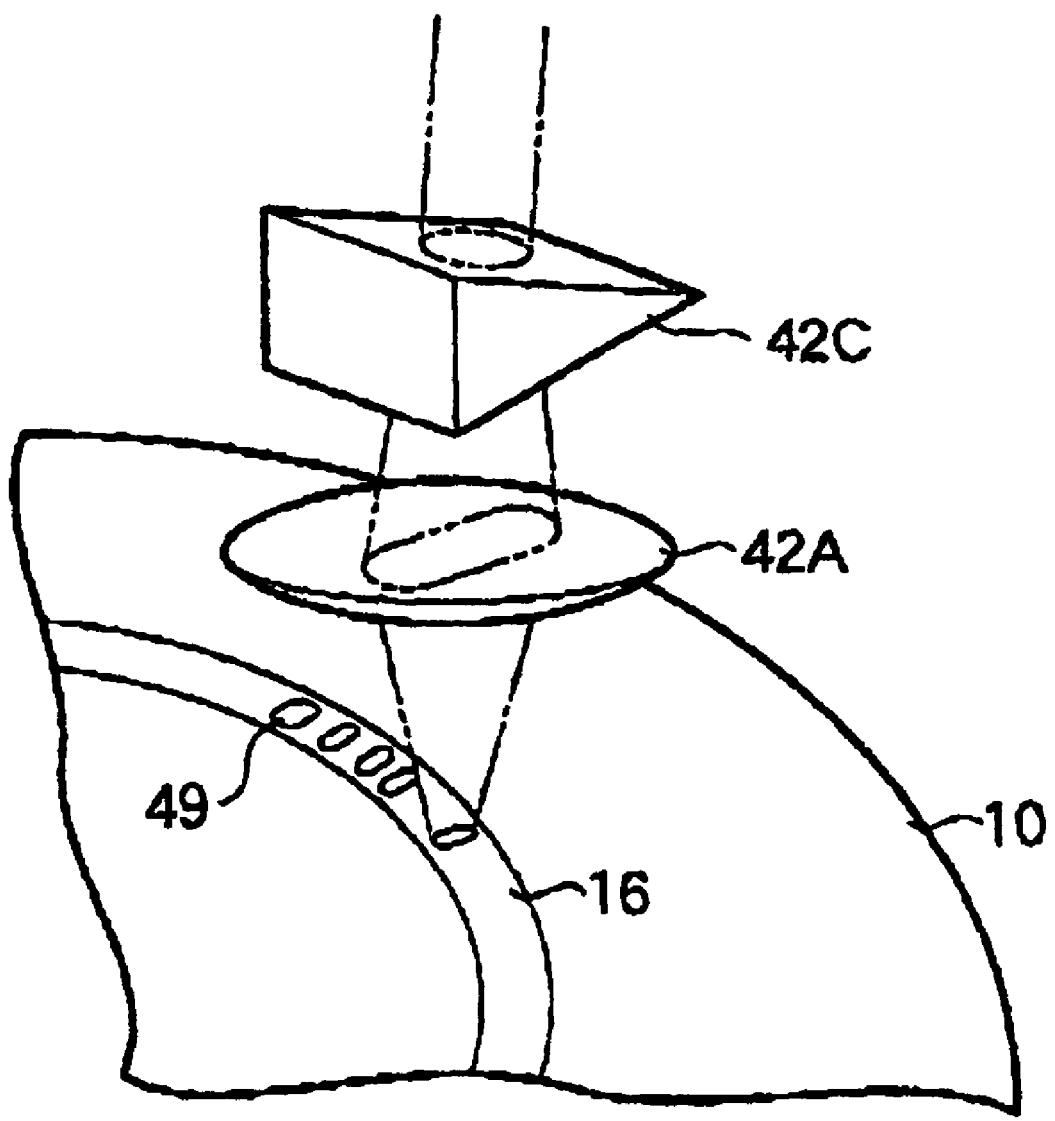
FIG. 4 is a partial perspective view showing a case where a laser beam irradiating a virtual recording cell forms another shape.
Figure 5:
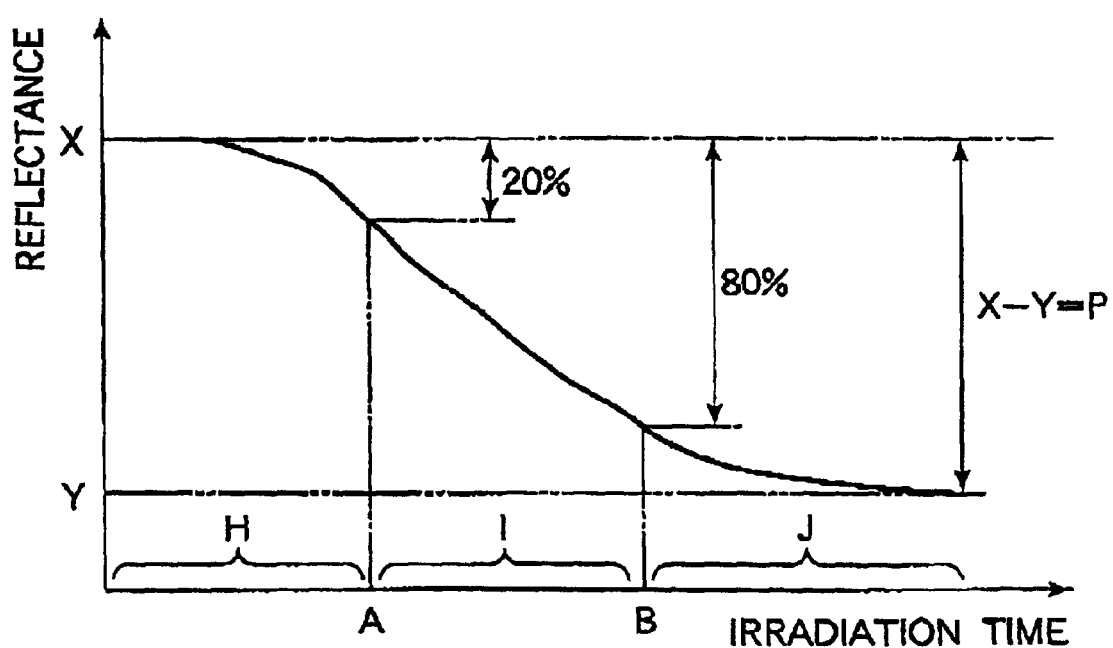
FIG. 5 is a conceptual view showing an example of fluctuations in the reflectance in an optical recording medium according to the present invention.

The laser beam mentioned above forms a circular shape at the position of the recording layer 12. As shown in FIG. 4 however, this can utilize, for example, a beam shaping prism 42C in addition to the objective lens 42A and the beam shape can be short in the feed direction of the recording medium 10 and a long ellipse or a linear shape at a right angle to this. For this case, because the recording marks 49 become shorter, the virtual recording cells can also be made shorter. In other words, the recording density can be increased.

As designated by reference numeral 52 in FIG. 1, by means of either having in advance a plurality of pits with a number of different reflectances matching the number of levels of the signal modulation or by performing multilevel recording as described above in advance on a portion of the optical recording medium, the recording medium 10 has information that separately identifies the recording medium at the recording marks 54 of these plurality of pits 52 and/or the portions where multilevel recording is complete, information that identifies an optical recording medium for use with multilevel recording, and specific information such as information that determines the laser beam power needed to record/regenerate the recording medium. This specific information can reliably identify an optical recording median for use with multilevel recording by means of regeneration of the optical recording medium and/or reading data for recording as well as separately identify these and determine the number of levels of the laser beam power in response to the number of pits already recorded. Because of this, even more reliable multilevel recording and regeneration is possible. In addition to this, as designated by reference numeral 56 in FIG. 1, the same effect can be achieved by means of providing a groove interruption part that cuts the groove of laser beam guides in the middle. These methods can be used independently or combined.

EXAMPLE

In the following examples of the present invention will be described.

Conditions for examples 1~3 described later are as follows.

A CD-R that uses dye on the recording layer 12 was used as the optical recording medium 10 and multilevel recording tests were performed.

For the recording method a high-frequency signal generator was connected to a DDU (laser wavelength=784 nm) manufactured by Pulstec Industrial Co., Ltd. used for recording evaluations of a CD-R.

A digital oscilloscope was connected to the DDU to evaluate regeneration.

Multilevel recording was performed by means of changing the laser beam irradiation time in six levels at a clock frequency of 4 MHz while rotating the optical recording medium at a fixed linear velocity of 4.8 m/sec. Regeneration was performed by means of irradiating a 1 mW laser beam while rotating the optical recording medium at the same fixed linear velocity and then detecting differences in the reflected amount of light.

For this case the diameter of the recording laser beam on the recording film was 1.6 $\mu$m. The size of the virtual recording cells 40 was 0.35 m in width equal to the width of the groove. For the length there were assumed to be 4,000,000 virtual recording cells on a groove with a total length of 4.8 m thus 4.8 m/4 MHz=1.2 W.

When the jitter value of the regenerated signal was read in and measured using a digital oscilloscope LC-534EL manufactured by Le Croy Corp. at this time, favorable results could be obtained.

The jitter value depends on the shape of the recording marks formed by the irradiation of the laser beam onto the recording layer. A small jitter value is significant to reliably form the recording marks. This allows information to be reliably recorded thereby making reliable regeneration possible as well.

Taking into consideration a case in which the recording is performed using a conventional binary record/regeneration method in the measurement apparatus for jitter values being used here, it is possible to judge whether favorable recording was performed if the jitter value is 10% or less.

Example 1

Cyanine dye was dissolved into a fluoridated alcohol serving as an coating solvent to prepare a 2 wt % coating solution used to form an organic dye recording layer. The coating solution was coated by a spin coat method in which the rpm was varied from 200 rpm up to 5000 rpm onto the surface of a pre-groove side of an optically transparent substrate with a diameter of 120 mm and a thickness of 1.2 mm. The substrate was made of a polycarbonate resin (Teijin Kasei Inc.: Panlight AD5503) whereon a spiral-shaped pre-groove (track pitch: 1.6 $\mu$m, pre-groove width 0.35 $\mu$m, pre-groove depth 0.18 $\mu$m) was formed by injection molding. As a result, an organic dye recording layer was formed in a thickness of about 200 nm from the bottom portion of the pre-groove.

On the optically transparent substrate used here a discrimination signal that indicates an optical recording medium is being used for multilevel recording and an information signal related to laser beam power were recorded in advance.

Next, a sputtering method was utilized to form an Ag reflecting layer approximately 100 nm thick on the organic dye recording layer. In addition, a spin coat method in which the rpm was varied from 300 rpm up to 4000 rpm used to coat an ultraviolet curable resin (Dainippon Ink and Chemicals, Incorporated: SD318) onto this reflecting layer. After the coating was completed, ultraviolet rays were irradiated by a high-pressure mercury vapor lamp from above the coating film to form a 10 $\mu$m thick protective layer.

The multilevel recording of the present invention was then attempted using the optical recording medium obtained in this manner.

The irradiation time of the laser beam while recording was changed in six levels of (1) 50 nsec, (2) 80 nsec, (3) 110 nsec, (4) 140 nsec, (5) 170 nsec, (6) 200 nsec to perform recording. The recording power was 14 mW.

Recording was performed over a period of one revolution of the disk during each of the irradiation times.

When recording was performed in this manner, multilevel recording was possible in six levels. Further, the discrimination signal indicating the optical recording medium used for multilevel recording and the information signal related to laser beam power could be detected and verified.

Example 2

An optical recording medium was prepared in the same manner as example 1 except for using a phthalocyanine dye and then using this optical recording medium multilevel recording was attempted in the same manner as example 1. As a result, multilevel recording could be performed. Further, the discrimination signal indicating the optical recording medium used for multilevel recording and the information signal related to laser beam power could be detected and verified.

Favorable results could also be obtained when measuring the jitter value of the signals recorded at this time in the same manner.

Example 3

An optical recording medium was prepared in the same manner as example 1 except for using an azo dye and then using this optical recording medium multilevel recording was attempted in the same manner as example 1. As a result, multilevel recording could be performed. Further, the discrimination signal indicating the optical recording medium used for multilevel recording and the information signal related to laser beam power could be detected and verified.

Favorable results could also be obtained when measuring the jitter value of the signals recorded at this time in the same manner

Comparative Example 1

Multilevel recording was attempted in the same manner as example 1 using a CD-RW with a phase-changing medium as the optical recording medium. The recording power was 11 mW.

It was discovered that and the jitter values were poor the respective signals when measuring the jitter value of the signals recorded at this time in the same manner.

The above results are shown in Table 1.

TABLE 1

Dye used and jitter value of recorded signal (%)

| Recording film | Example 1 Cyanine | Example 2 Phthalo-cyanine | Example 3 Azo | Comparative example 1 Phase-changing film |
|---|---|---|---|---|
| Each jitter value (%) | | | | |
| Laser irradiation time (1) | 7.5 | 7.7 | 7.1 | 12.4 |
| Laser irradiation time (2) | 7.3 | 7.8 | 7.4 | 12.0 |
| Laser irradiation time (3) | 7.2 | 7.7 | 7.8 | 11.0 |
| Laser irradiation time (4) | 7.0 | 7.6 | 8.2 | 12.1 |
| Laser irradiation time (5) | 6.6 | 7.9 | 8.4 | 12.5 |
| Laser irradiation time (6) | 6.7 | 8.1 | 8.4 | 14.5 |

Example 4

An optical recording medium was produced in the same manner as example 1 and recording performed.

The initial reflectance of the optical recording medium was 72% (0.72) and the minimum limit reflectance was set to 20% (0.20) when the laser was irradiated for 250 nsec or more. Consequently, the reflectance fluctuation width was 0.52 (=0.72−0.20).

The irradiation time A necessary to reduce the reflectance of the optical recording medium, or the initial reflectance 0.72 by 20% of the reflectance fluctuation width (approximately 0.1) was 50 nsec and the irradiation time B necessary to reduce this by 80% of this reflectance fluctuation width (approximately 0.42) was 200 nsec. Consequently, the reflectance fluctuation balance T=(B−A)/A=3.

Multilevel recording of six levels was achieved with this optical recording medium and this recorded data could be reliably read. Further, the jitter values for the recording marks (1)–(6) are shown in the table below and it is understood that a favorable evaluation of 10% or less has been obtained in all the recording marks.

Example 5

The cyanine in example 4 was changed to phthalocyanine and the coating solvent was changed to methylcyclohexane to prepare a dye solution. An optical recording medium was produced entirely in the same manner as example 4 except for the dye solution as above.

The laser beam power for recording was set to 13 mW. The linear recording velocity at this time was 4.8 m/s and the clock frequency for the recording was 4 MHz (250 nsec). The laser irradiation times for recording were (1) 50 nsec, (2) 70 nsec, (3) 90 nsec, (4) 110 nsec, (5) 130 nsec, (6) 150 nsec. Each signal was recorded over a period of one revolution of the disk.

The initial reflectance of the optical recording medium was 68% (0.68) and the minimum limit reflectance was set to 22% (0.22) when the laser was irradiated for 250 nsec or more. Consequently, the reflectance fluctuation width was 0.46 (=0.68−0.22).

The irradiation time A necessary to reduce the reflectance of the optical recording medium, or the initial reflectance 0.68 by 20% of the reflectance fluctuation width (approximately 0.92) was 50 nsec and the irradiation time B necessary to reduce this by 80% of this reflectance fluctuation width (approximately 0.37) was 150 nsec. Consequently, the reflectance fluctuation balance T=(B−A)/A=2.

Multilevel recording of six levels was achieved with this optical recording medium and this recorded data could be reliably read. Further, the jitter values for the recording marks (1)–(6) are shown in table 2 below and it is understood that a favorable evaluation of 10% or less has been obtained in all the recording marks.

Example 6

The dye solution of example 4 was changed to a mixture of cyanine and an azo retal complex and an optical recording medium was produced in the same manner as example 4 other than this. The mixture ratio of the cyanine and the azo metal complex was 50:50 wt %.

The laser beam power for recording was set to 14 mW. The linear recording velocity at this time was 4.8 m/s and the clock frequency for the recording was 4 MHz (250 nsec). The laser irradiation times for recording were (1) 20 nsec, (2) 56 nsec, (3) 92 nsec, (4) 128 nsec, (5) 164 nsec, (6) 200 nsec. Each signal was recorded over a period of one revolution of the disk.

The initial reflectance of the optical recording medium was 70% (0.70) and the minimum limit reflectance was set to 21% (0.21) when the laser was irradiated for 250 nsec or more. Consequently, the reflectance fluctuation width was 0.49 (=0.70−0.21).

The irradiation time A necessary to reduce the reflectance of the optical recording medium, or the initial reflectance 0.70 by 20% of the reflectance fluctuation width (approximately 0.10) was 20 nsec and the irradiation time B necessary to reduce this by 80% of this reflectance fluctuation width (approximately 0.39) was 200 nsec. Consequently, the reflectance fluctuation balance T=(B−A)/A=9.

Multilevel recording of six levels was achieved with this optical recording medium and this recorded data could be reliably read. Further, the jitter values for the recording marks (1)–(6) are shown in table 2 above and it is understood that a favorable evaluation of 10% or less has been obtained in all the recording marks.

Comparative Example 2

An optical recording medium was produced with a composition identical to the dye solution of example 5. While producing this medium, the film thickness of the dye was changed to 250 nm by means of adjusting the rpms of the spin coat method and then the reflecting film was further changed to gold, The laser beam power for recording was set to 13 mW. The linear recording velocity at this time was 4.8 m/s and the clock frequency for the recording was 4 MHz (250 nsec).

The laser irradiation times for recording were (1) 50 nsec, (2) 70 nsec, (3) 90 nsec, (4) 110 nsec, (5) 130 nsec, (6) 150 nsec. Each signal was recorded over a period of one revolution of the disk.

The initial reflectance of the optical recording medium was 70% (0.70) and the minimum limit reflectance reached to 20% (0.20) when the laser was irradiated for 250 nsec or more. Consequently, the reflectance fluctuation width was 0.50 (=0.70–0.20).

The irradiation time A necessary to reduce the reflectance of the optical recording medium, or the initial reflectance 0.70 by 20% of the reflectance fluctuation width (approximately 0.10) was 50 nsec and the irradiation time 5 necessary to reduce this by 80% of this reflectance fluctuation width (approximately 0.40) was 140 nsec. Consequently, the reflectance fluctuation balance T=(B−A)/A=1.8.

Recorded data of six levels could not be reliably read with this optical recording medium. Further, the jitter values for the recording marks (1)–(6) are shown in the table below. All the recording marks had 10% or more and it is understood that this was an unsatisfactory evaluation.

Comparative Example 3

An optical recording medium was produced by changing the mixture ratio of the dye solution in example 6. Specifically, the mixture ratio of the cyanine and the azo metal complex was 30: 70 wt %.

The laser beam power for recording was set to 15 mnW. The linear recording velocity at this time was 4.8 m/s and the clock frequency for the recording was 4 MHz (250 nsec). The laser irradiation times for recording were (1) 20 nsec, (2) 64 nsec, (3) 108 nsec, (4) 152 nsec, (5) 196 nsec, (6) 240 nsec. Each signal was recorded over a period of one revolution of the disk.

The initial reflectance of the optical recording medium was 70% (0.70) and the minimum limit reflectance reached to 20% (0.20) when the laser was irradiated for 250 nsec or more. Consequently, the reflectance fluctuation width was 0.50 (=0.70–0.20).

The irradiation time A necessary to reduce the reflectance of the optical recording medium, or the initial reflectance 0.70 by 20% of the reflectance fluctuation width (approximately 0.10) was 20 nsec and the irradiation time B necessary to reduce this by 80% of the reflectance fluctuation width (approximately 0.40) was 240 nsec. Consequently, the reflectance fluctuation balance T=(B−A)/A=11.

Recorded data (4) and (5) could be reliably read with this optical recording medium although other recorded data could not be. Further, the jitter values for the recording marks (1)–(6) in this optical recording medium are shown in the table below. A portion of the recording marks had 10% or more and it is understood that this was an unsatisfactory evaluation.

Comparative Example 4

An optical recording medium was produced completely in the same manner as example 4.

The laser beam power for recording was set to 17 mW. The linear recording velocity at this time was 4.8 m/s and the clock frequency for the recording was 4 MHz (250 nsec) The laser irradiation times for recording were (1) 10 nsec, (2) 40 nsec, (3) 70 nsec, (4) 100nsec, (5) 130 nsec, (6) 160 nsec.

The initial reflectance of the optical recording medium was 72% (0.72) and the minimum limit reflectance reached to 20% (0.20) when the laser was irradiated for 200 nsec or more. Consequently, the reflectance fluctuation width was 0.52 (=0.72–0.20).

The irradiation time A necessary to reduce the reflectance of the optical recording medium, or the initial reflectance 0.72 by 20% of the reflectance fluctuation width (approximately 0.10) was 10 nsec and the irradiation time B necessary to reduce this by 80% of this reflectance fluctuation width (approximately 0.42) was 160 nsec. Consequently, the reflectance fluctuation balance T=(B−A)/A=15.

All recorded data could not be reliably read with this optical recording medium. Further, the jitter values for the recording marks (1)–(6) in this optical recording medium are shown in the table below. All the recording marks had 10% or more and it is understood that this is even worse than comparative example 2 above (T=11).

Comparative Example 5

An optical recording medium was produced in the same manner as example 4.

The laser beam power for recording was set to 11 mW. The linear recording velocity at this time was 4.8 m/s and the clock frequency for the recording was 4 MHz (250 nsec). The laser irradiation times for recording were (1) 100 nsec, (2) 130 nsec, (3) 160 nsec, (4) 190 nsec, (5) 220 nsec, (6) 250 nsec.

The initial reflectance of the optical recording medium was 72% (0.72) and the minimum limit reflectance reached to 20% (0.20) when the laser was irradiated for 300 nsec or more. Consequently, the reflectance fluctuation width was 0.52 (=0.72–0.20).

The irradiation time A necessary to reduce the reflectance of the optical recording medium, or the initial reflectance 0.72 by 20% of the reflectance fluctuation width (approximately 0.10) was 100 nsec and the irradiation time B necessary to reduce this by 80% of this reflectance fluctuation width (approximately 0.42) was 250 nsec. Consequently, the reflectance fluctuation balance T=(B−A)/A=1.5.

None of the recorded data could be reliably read with this optical recording medium. Further, the jitter values for the recording marks (1)–(6) in this optical recording medium are shown in the table below. All the recording marks had 10% or more and it is understood that this value is even worse than comparative example 1 above (T=1.8).

TABLE 2

Value of reflectance fluctuation balance T and jitter value of recorded signal (%)

| | Example 4 | Example 5 | Example 6 | Comparative example 2 | Comparative example 3 | Comparative example 4 | Comparative example 5 |
|---|---|---|---|---|---|---|---|
| Reflectance fluctuation balance T Each jitter value (%) | 3.0 | 2.0 | 9.0 | 1.8 | 11.0 | 15.0 | 1.5 |
| Laser irradiation time (1) | 7.5 | 6.8 | 7.2 | 11.5 | 10.9 | 13.2 | 12.8 |
| Laser | 7.3 | 6.5 | 6.8 | 11.0 | 10.8 | 13.1 | 12.6 |

TABLE 2-continued

Value of reflectance fluctuation balance T
and jitter value of recorded signal (%)

|  | Example 4 | Example 5 | Example 6 | Comparative example 2 | Comparative example 3 | Comparative example 4 | Comparative example 5 |
|---|---|---|---|---|---|---|---|
| Laser irradiation time (2) |  |  |  |  |  |  |  |
| Laser irradiation time (3) | 7.3 | 6.3 | 6.9 | 10.8 | 10.5 | 12.8 | 12.3 |
| Laser irradiation time (4) | 7.0 | 6.3 | 7.0 | 10.5 | 9.9 | 12.5 | 12.1 |
| Laser irradiation time (5) | 6.6 | 6.3 | 7.4 | 10.8 | 9.8 | 12.6 | 12.5 |
| Laser irradiation time (6) | 6.7 | 6.5 | 7.5 | 10.9 | 10.5 | 13.0 | 12.5 |

Example 7

An optical recording medium was produced entirely in the same manner as example 4 except for the cyanine in example 4 was changed to another type of cyanine.

The laser beam power for recording was set to 14 mW. The linear recording velocity at this time was 4.8 m/s and the clock frequency for the recording was 4 MHz (250 nsec). The laser irradiation times for recording were (1) 50 nsec, (2) 75 nsec, (3) 100 nsec, (4) 125 nsec, (5) 150 nsec, (6) 175 nsec. Each signal was recorded over a period of one revolution of the disk.

The initial reflectance of the optical recording medium was 65% (0.65) and the minimum limit reflectance was set to 28% (0.28) when the laser was irradiated for 250 nsec or more. Consequently, the reflectance fluctuation width was 0.37 (=0.65−0:28).

The irradiation time A necessary to reduce the reflectance of the optical recording medium, or the initial reflectance 0.65 by 20% of the reflectance fluctuation width (approximately 0.07) was 50 nsec and the irradiation time B necessary to reduce this by 80% of this reflectance fluctuation width (approximately 0.30) was 175 nsec. Consequently, the reflectance fluctuation balance T=(B−A)/A=2.5.

Multilevel recording of six levels was achieved with this optical recording medium and this recorded data could be reliably read. Further, the jitter values for the recording marks (1)~(6) are shown in table 3 below and it is understood that a favorable evaluation of 10% or less has been obtained in all the recording marks.

Comparative Example 6

An optical recording medium was produced entirely in the same manner as example 4 except for cyanine in example 4 was changed to a type of cyanine other than of examples 4 and 7.

The laser beam power for recording was set to 14 mW. The linear recording velocity at this time was 4.8 m/s and the clock frequency for the recording was 4 MHz (250 nsec). The laser irradiation times for recording were (1) 15 nsec, (2) 55 nsec, (3) 95 nsec, (4) 135 nsec, (5) 175 nsec, (6) 215 nsec. Each signal was recorded over a period of one revolution of the disk.

The initial reflectance of the optical recording medium was 65% (0.65 and the minimum limit reflectance reached to 32% (0.32) when the laser was irradiated for 250 nsec or more. Consequently, the reflectance fluctuation width was 0.35 (=0.65−0.32).

The irradiation time A necessary to reduce the reflectance of the optical recording medium, or the initial reflectance 0.65 by 20% of the reflectance fluctuation width (approximately 0.07) was 15 nsec and the irradiation time B necessary to reduce this by 80% of this reflectance fluctuation width (approximately 0.28) was 215 nsec. Consequently, the reflectance fluctuation balance T=(B−A)/A=13.3.

Recorded data of six levels could not be reliably read with this optical recording medium. Further, the jitter values for the recording marks (1)~(6) are shown in the table 3 below. All the recording marks had 10% or more and it is understood that this was an unsatisfactory evaluation.

Comparative Example 7

An optical recording medium was produced entirely in the same manner as example 4 except for cyanine in example 4 was changed to a type of cyanine other than of examples 4, 7 and comparative example 6.

The laser beam power for recording was set to 14 mW. The linear recording velocity at this time was 4.8 m/S and the clock frequency for the recording was 4 MHz (250 nsec) The laser irradiation times for recording were (1) 10 nsec, (2) 55 nsec, (3) 100 nsec, (4) 145 nsec, (5) 190 nsec, (6) 235 nsec. Each signal was recorded over a period of one revolution of the disk.

The initial reflectance of the optical recording medium was 71% (0.71) and the minimum limit reflectance reached to 38% (0.38) when the laser was irradiated for 250 nsec or more. Consequently, the reflectance fluctuation width was 0.33 (=0.71−0.38).

The irradiation time A necessary to reduce the reflectance of the optical recording medium, or the initial reflectance 0.71 by 20% of the reflectance fluctuation width (approximately 0.07) was 10 nsec and the irradiation time B necessary to reduce this by 80% of the reflectance fluctuation width (approximately 0.26) was 235 nsec. Consequently, the reflectance fluctuation balance T=(B−A)/A=22.5.

Recorded data of six levels could not be reliably read with this optical recording medium. Further, the jitter values for the recording marks (1)~(6) are shown in the table 3 below. All the recording marks had 10% or more and it is understood that this was an unsatisfactory evaluation.

Example 8

The dye solution was produced by changing the phthalocyanine of example 5 to another type of phthalocyanine. An optical recording medium was produced in the same manner as example 5 other than this.

The laser beam power for recording was set to 13 mW. The linear recording velocity at this time was 4.8 m/s and the clock frequency for the recording was 4 MHz (250 nsec). The laser irradiation times for recording were (1) 50 nsec, (2) 75 nsec, (3) 100 nsec, (4) 125 nsec, (5) 150 nsec, (6) 175 nsec. Each signal was recorded over a period of one revolution of the disk.

The initial reflectance of the optical recording medium was 43% (0.43) and the minimum limit reflectance was set to 22% (0.22) when the laser was irradiated for 250 nsec or more. Consequently, the reflectance fluctuation width was 0.21 (=0.43–0.22).

The irradiation time A necessary to reduce the reflectance of the optical recording medium, or the initial reflectance 0.43 by 20% of the reflectance fluctuation width (approximately 0.04) was 50 nsec and the irradiation time B necessary to reduce this by 80% of this reflectance fluctuation width (approximately 0.17) was 175 nsec. Consequently, the reflectance fluctuation balance T=(B−A)/A=2.5.

Multilevel recording of six levels was achieved with this optical recording medium and this recorded data could be reliably read. Further, the jitter values for the recording marks (1)–(6) are shown in table 3 below and it is understood that a favorable evaluation of 10% or less has been obtained in all the recording marks.

Example 9

The dye solution was produced by changing the phthalocyanine of example 5 to a type of phthalocyanine other than of examples 5 and 8. An optical recording medium was produced in the same manner as example 8 other than this.

The laser beam power for recording was set to 13 mW. The linear recording velocity at this time was 4.8 m/s and the clock frequency for the recording was 4 MHz (250 nsec). The laser irradiation times for recording were (1) 43 nsec, (2) 67 nsec, (3) 94 nsec, (4) 121 nsec, (5) 148 nsec, (6) 175 nsec. Each signal was recorded over a period of one revolution of the disk.

The initial reflectance of the optical recording medium was 52% (0.52) and the minimum limit reflectance was set to 22% (0.22) when the laser was irradiated for 250 nsec or more. Consequently, the reflectance fluctuation width was 0.30 (=0.52–0.22).

The irradiation time A necessary to reduce the reflectance of the optical recording medium, or the initial reflectance 0.30 by 20% of the reflectance fluctuation width (approximately 0.06) was 43 nsec and the irradiation time B necessary to reduce this by 80% of this reflectance fluctuation width (approximately 0.24) was 175 nsec. Consequently, the reflectance fluctuation balance T=(B−A)/A=3.07.

Multilevel recording of six levels was achieved with this optical recording medium and this recorded data could be reliably read. Further, the jitter values for the recording marks (1)–(6) are shown in table 3 below and it is understood that a favorable evaluation of 10% or less has been obtained in all the recording marks.

Comparative Example 8

The dye solution was produced by changing the phthalocyanine of example 5 to a type of phthalocyanine other than of example 5, 8 and 9. An optical recording medium was produced in the same manner as example 5 other than this.

The laser beam power for recording was set to 13 mW. The linear recording velocity at this time was 4.8 m/s and the clock frequency for the recording was 4 MHz (250 nsec). The laser irradiation times for recording were (1) 15 nsec, (2) 57 nsec, (3) 99 nsec, (4) 141 nsec, (5) 183 nsec, (6) 225 nsec. Each signal was recorded over a period of one revolution of the disk.

The initial reflectance of the optical recording medium was 37% (0.37) and the minimum limit reflectance was set to 22% (0.22) when the laser was irradiated for 250 nsec or more. Consequently, the reflectance fluctuation width was 0.15 (=0.37–0.22).

The irradiation time A necessary to reduce the reflectance of the optical recording medium, or the initial reflectance 0.37 by 20% of the reflectance fluctuation width (approximately 0.03) was 15 nsec and the irradiation time B necessary to reduce this by 80% of this reflectance fluctuation width (approximately 0.12) was 225 nsec. Consequently, the reflectance fluctuation balance T=(B−A)/A=14.

Recorded data of six levels could not be reliably read with this optical recording medium. Further, the jitter values for the recording marks (1)–(6) are shown in the table 3 below. All the recording marks had 10% or more and it is understood that this was an unsatisfactory evaluation.

TABLE 3

Value of reflectance fluctuation balance T and jitter value of recorded signal (%)

| | Example 7 | Example 8 | Example 9 | Comparative example 6 | Comparative example 7 | Comparative example 8 |
|---|---|---|---|---|---|---|
| Reflectance fluctuation balance T Each jitter value (%) | 2.5 | 2.5 | 3.07 | 13.3 | 22.5 | 14.0 |
| Laser irradiation time (1) | 7.2 | 6.9 | 7.0 | 13.8 | 15.9 | 13.8 |
| Laser irradiation time (2) | 7.0 | 6.7 | 6.8 | 13.3 | 15.2 | 13.5 |
| Laser irradiation time (3) | 6.9 | 6.5 | 6.7 | 13.0 | 14.8 | 13.2 |
| Laser irradiation time (4) | 6.7 | 6.0 | 7.1 | 12.9 | 14.1 | 12.8 |
| Laser irradiation time (5) | 6.4 | 6.1 | 7.6 | 12.8 | 13.7 | 12.5 |
| Laser irradiation time (6) | 6.6 | 6.4 | 7.9 | 13.9 | 14.5 | 13.6 |

Example 10

An optical recording medium was produced in the same manner as example 1.

In this example, the shortest irradiation time TS is (1) 50 nsec and the longest irradiation time TL is (6) 200 nsec. Consequently, the ratio (TS/TL) is 0.250 satisfying the relational formula (2) above. Multilevel recording of six levels was achieved with this optical recording medium and the recorded data could be reliably read. Further, the jitter values for the recording marks (1)–(6) in this medium are shown in the table below and it is understood that a favorable evaluation of 10% or less has been obtained in all the recording marks.

Example 11

An optical recording medium was produced in the same manner as example 10.

The laser beam power during multilevel recording was set to 13 mW. The linear recording velocity at this time was 4.8 n/s and the clock frequency for the recording was 4 MHz (250 nsec) The laser irradiation times for recording were (1) 100 nsec, (2) 125 nsec, (3) 150 nsec, (4) 175 nsec, (5) 200 nsec, (6) 225 nsec. Each signal was recorded over a period of one revolution of the disk.

In this example, the shortest irradiation time TS is (1) 100 nsec and the longest irradiation time TL is (6) 225 nsec. Consequently, the ratio (TS/TL) is 0.444 satisfying the relational formula (2) above. Multilevel recording of six levels was achieved with this optical recording medium and the recorded data could be reliably read. Further, the jitter values for the recording marks (1)–(6) in this optical recording medium are shown in the table below and it is understood that a favorable evaluation of 10% or less has been obtained in all the recording marks.

Example 12

An optical recording medium was produced in the same manner as example 10.

The laser beam power during multilevel recording was set to 15 mW. The linear recording velocity at this time was 4.8 m/s and the clock frequency for the recording was 4 MHz (250 nsec) The laser irradiation times for recording were (1) 10 nsec, (2) 40 nsec, (3) 70 nsec, (4) 100 nsec, (5) 130 nsec, (6) 160 nsec. Each signal was recorded over a period of one revolution of the disk.

In this example, the shortest irradiation time TS is (1) 10 nsec and the longest irradiation time TL is (6) 160 nsec. Consequently, the ratio (TS/TL) is 0.063 satisfying the relational formula (2) above. Multilevel recording of six levels was achieved with this optical recording medium and the recorded data could be reliably read. Further, the jitter values for the recording marks (1)–(6) in this optical recording medium are shown in the table below and it is understood that a favorable evaluation of 10% or less has been obtained in all the recording marks.

Comparative Example 9

An optical recording medium was produced in the same manner as example 1.

The laser beam power during multilevel recording was set to 17 mW. The linear recording velocity at this time was 4.8 m/s and the clock frequency for the recording was 4 MHz (250 nsec). The laser irradiation times for recording were (1) 5 nsec, (2) 35 nsec, (3) 60 nsec, (4) 90 nsec, (5) 120 nsec, (6) 145 nsec. Each signal was recorded over a period of one revolution of the disk.

In this example, the shortest irradiation time TS is (1) 5 nsec and the longest irradiation time TL is (6) 145 nsec. Consequently, the ratio (TS/TL) is 0.34 which does not satisfy the relational formula (2) above. Multilevel recording of six levels was not achieved with this optical recording medium and the recorded data could not be reliably read. Further, the jitter values for the recording marks (1)–(6) in this optical recording medium are shown in the table below and it is understood that an unfavorable evaluation of over 10% has been obtained in all the recording marks.

Comparative Example 10

An optical recording medium was produced in the same manner as example 10.

The laser beam power during multilevel recording was set to 12 mW. The linear recording velocity at this time was 4.8 m/s and the clock frequency for the recording was 4 MHz (250 nsec) The laser irradiation times for recording were (1) 120 nsec, (2) 140 nsec, (3) 160 nsec, (4) 180 nsec, (5) 200 nsec, (6) 220 nsec. Each signal was recorded over a period of one revolution of the disk.

In this example, the shortest irradiation time TS is (1) 120 nsec and the longest irradiation time TL is (6) 220 nsec. Consequently, the ratio (TS/TL) is 0.545 which does not satisfy the relational formula (2) above. Multilevel recording of six levels was not achieved with this optical recording medium and the recorded data could not be reliably read. Further, the jitter values for the recording marks (1)–(6) in this optical recording medium are shown in the table below and it is understood that an unfavorable evaluation of over 10% has been obtained in all the recording marks.

Comparative Example 11

Multilevel recording was performed using a CD-RW as the optical recording medium.

This CD-RW has a phase-changing film formed as a recording layer that is not an organic dye but includes Ag-In-Sb-Te. This phase-changing film records data by physically performing the phase transition between a crystalline phase (crystal) and a noncrystalline phase (amorphous) A dielectric layer is formed on both sides of the recording layer although the rest of the composition is almost identical to the CD-R already disclosed.

For this CD-RW the laser beam power for recording was set to 12 mW. The linear recording velocity at this time was 4.8 m/s and the clock frequency for the recording was 4 MHz (250 nsec). The laser irradiation times for recording were (1) 60 nsec, (2) 65 nsec, (3) 70 nsec, (4) 75 nsec, (5) 80 nsec, (6) 85 nsec. Each signal was recorded over a period of one revolution of the disk.

In this example, the shortest irradiation time TS is (1) 60 nsec and the longest irradiation time TL is (6) 85 nsec. Consequently, the ratio (TS/TL) is 0.707 which does not satisfy the relational formula (2) above. Multilevel recording of six levels was not achieved with this CD-RW and the recorded data could not be reliably read. Further, the jitter values for the recording marks (1)–(6) in this optical recording medium are shown in the table below and because all the recording marks exceeded 10%, it is understood that this evaluation is even worse than comparative example 10 above (TS/TL 0.545).

TABLE 4

Value to Ts/Tl and jitter value of recorded signals

| | Example 10 | Example 11 | Example 12 | Comparative example 9 | Comparative example 10 | Comparative example 11 |
|---|---|---|---|---|---|---|
| TS/TL Each jitter value (%) | 0.250 | 0.444 | 0.063 | 0.034 | 0.545 | 0.707 |
| Laser irradiation time (1) | 7.5 | 7.1 | 8.3 | 11.5 | 11.5 | 13.1 |
| Laser irradiation time (2) | 7.3 | 7.2 | 8.4 | 11.0 | 10.5 | 12.5 |
| Laser irradiation time (3) | 7.2 | 7.1 | 8.1 | 10.5 | 10.2 | 12.3 |
| Laser irradiation | 7.0 | 7.1 | 8.8 | 10.6 | 9.9 | 12.5 |

TABLE 4-continued

Value to Ts/Tl and jitter value of recorded signals

| | Example 10 | Example 11 | Example 12 | Comparative example 9 | Comparative example 10 | Comparative example 11 |
|---|---|---|---|---|---|---|
| time (4) | | | | | | |
| Laser irradiation time (5) | 6.6 | 8.4 | 9.1 | 11.2 | 10.6 | 12.9 |
| Laser irradiation time (6) | 6.7 | 8.5 | 9.2 | 11.1 | 10.8 | 13.0 |

TS (sec): Shortest irradiation time of laser beam
TL (sec): Longest irradiation time of laser beam While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An optical recording medium that can record information by irradiating laser beam to form recording marks on a recording layer and read the recorded information by irradiating a reading laser beam onto the recording mark; wherein said optical recording medium has virtual recording cells on said recording layer specified in an arbitrary unit length in a direction of relative movement between the laser beam and the recording layer and in a unit width in a direction that intersects the above-mentioned direction at a right angle and is continuously set in said direction of movement; said, recording layer on said virtual recording cells can form the recording marks with different sizes for each of said virtual recording cell in correspondence to the modulation of the irradiation time of the laser beam in five levels or more to perform multilevel recording of five levels or more of information by means of modulating the reflectance based on at least the area ratio out of the area ratio of the recording mark to the virtual recording cell and transmittance.

2. The optical recording medium according to claim 1, wherein the unit length of said virtual recording cell is set almost equal to the length of the recording mark formed by laser beam irradiation for the maximum amount of time.

3. The optical recording medium according to claim 1, wherein: grooves for guiding laser beam are provided along said recording layer, said virtual recording cells are set inside said grooves and said unit width matches a width of said groove.

4. The optical recording medium according to claim 1, wherein said unit length in said virtual recording cells are equal to or less than the diameter of beam waist of said reading laser beam.

5. The optical recording medium according to claim 1, wherein information is recorded in multiple levels in advance on one part of said recording layer.

6. The optical recording medium according to claim 1, wherein specific information which represents a multilevel recording medium is recorded on at least one of said virtual recording cells and a multilevel recorded part.

7. The optical recording medium according to claim 1, wherein grooves for guiding Laser beam are provided along said recording layer and are cut in the middle.

8. The optical recording medium according to claim 1, wherein said recording layer is made of an organic dye.

9. The optical recording medium according to claim 1, wherein when a reflectance fluctuation width stipulated from an initial reflectance X % of said virtual recording cells before irradiation of said laser beam and from the minimum limit reflectance Y % after irradiation of said laser beam is X/100–Y/100, said virtual recording cells are set to have a characteristic of:

$1.8 < (B-A)/A < 11$ where A is the irradiation time necessary to reduce the initial reflectance X % by 20%, assuming this entire fluctuation width to be 100%, through the use of said laser beam irradiation at a fixed power and B is the irradiation time necessary to reduce the initial reflectance X % by 80% of said reflectance fluctuation width X/100–Y/100, through the use of said laser beam irradiation, such that said optical recording medium can perform multilevel recording on said virtual recording cells by switching the irradiation time of said laser beam at a fixed power in five levels or more.

10. The optical recording medium according to claim 9, wherein the recording marks with a plurality of sizes, formed by switching the irradiation time of said laser beam in five levels or more and recording at multiple levels include a recording mark with a length equal to or less than the diameter of converging beam waist of the reading laser beam as a part.

11. The optical recording medium according to claim 9, wherein said recording layer of said optical recording medium includes an organic dye component.

12. The optical recording medium according to any one of claims 9–11, wherein said initial reflectance X of said virtual recording cells before recording is 40% or more and said minimum limit reflectance Y after recording is (X−10)% or less.

13. The optical recording medium according to claim 12, wherein said minimum limit reflectance Y after recording is 30% or less.

14. The optical recording medium according to claim 1, wherein the recording medium is composed such that said laser beam irradiates to form a plurality of recording marks with different sizes in a state in which a ratio between a longest irradiation time TL and a shortest irradiation time TS during the irradiation of said recording layer at said irradiation time of five levels or more satisfies the relationship of $0.05 < TS/TL < 0.5$.

15. The optical recording medium according to claim 14, wherein said recording layer includes an organic dye.

16. The optical recording medium according to claim 14, wherein said longest irradiation time TL of said laser beam is set to $2 \times 10^{-8} < TL < 1 \times 10^{-6}$ (sec).

17. The optical recording medium according to claim 16, wherein said recording layer includes an organic dye.

18. An optical recording method comprising the step of irradiating a laser beam onto a recording layer while moving either the recording layer or laser beam in a constant direction to form recording marks onto the recording layer, thereby recording information; said optical recording method further comprising the steps of:

assuming virtual recording cells continuously in said movement direction on said recording layer;

modulating an irradiation time of the laser beam in five levels of more for each of said virtual recording cell; and forming the recording marks with different sizes in said virtual recording cells to perform multilevel recording of five levels or more of information by means of modulating the reflectance of the entire virtual recording cells based on at least the area ratio out of the area ratio of the recording mark to the virtual recording cell and transmittance.

19. The optical recording method according to claim 18, wherein said recording layer comprises a material that modulates at least the size out of the size and transmittance of the recording mark, only in response to the irradiation time when the beam diameter of the laser beam is fixed, and the laser beam irradiates with a fixed beam diameter.

20. The optical recording method according to claim 18, wherein said laser beam irradiates to form a plurality of the ETCH recording marks with different sizes in a state in which a ratio between a longest irradiation time TL and a shortest irradiation time TS during said irradiation time of five levels or more satisfies the relationship of $0.05 < TS/TL < 0.5$.

21. The optical recording method according to claim 20, wherein the recording marks with different sizes formed by irradiation of said laser beam include a recording mark with a length equal to or less than the diameter of the converging beam of the reading laser as a part.

22. The optical recording method according to claim 20, wherein said longest irradiation time TL of said laser beam is set to $2 \times 10^{-8} < TL < 1 \times 10^{31\ 6}$ (sec).

23. The optical recording medium according to claim 18, wherein when a reflectance fluctuation width stipulated from an initial reflectance X % of said virtual recording cell before irradiation of said laser beam and from the minimum limit reflectance Y % after irradiation of said laser beam is X/100−Y/100, said virtual recording cells are set to have a characteristic of:

$$1.8 < (B-A)/A < 11$$

where A is the irradiation time necessary to reduce the initial reflectance X % by 20%, assuming this entire fluctuation width to be 100%, through the use of said laser beam irradiation at a fixed power and B is the irradiation time necessary to reduce the initial reflectance X % by 80% of said reflectance fluctuation width X/100−Y/100, through the use of said laser beam irradiation, and multilevel recording is performed on said virtual recording cell by switching the irradiation time of said laser beam at a fixed power in five levels or more.

24. The optical recording medium according to claim 23, wherein multilevel recording is performed by switching the irradiation time of said laser beam in five levels or more so as that the recording marks with a plurality of sizes formed by a laser beam irradiation include a recording mark with a length equal to or less than the diameter of converging beam waist of the reading laser beam as a part.

25. The optical recording medium according to claim 23, wherein said recording layer includes an organic dye component so that the recording layer has the characteristics mentioned above.

26. The optical recording medium according to claim 23, wherein the characteristics of said recording layer are set in order that said initial reflectance X of said virtual recording cell before recording is 40% or more and said minimum limit reflectance Y after recording is (X−10)% or less.

27. The optical recording medium according to claim 26, wherein the characteristics of said recording layer are set in order that said minimum limit reflectance Y after recording is 30% or less.

* * * * *